May 10, 1966     O. H. NESTOR     3,250,893
METHOD FOR PROVIDING A SOURCE OF HEAT
Filed Oct. 1, 1963
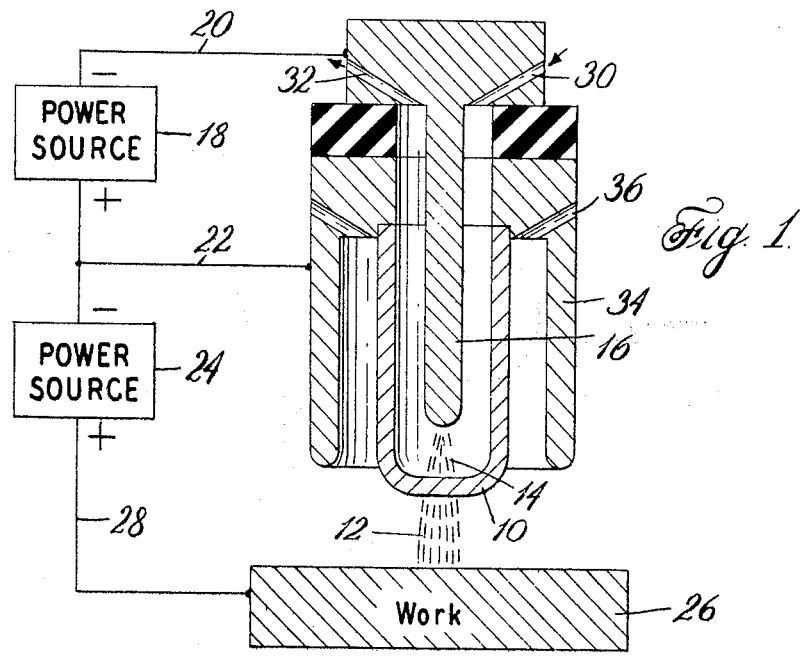
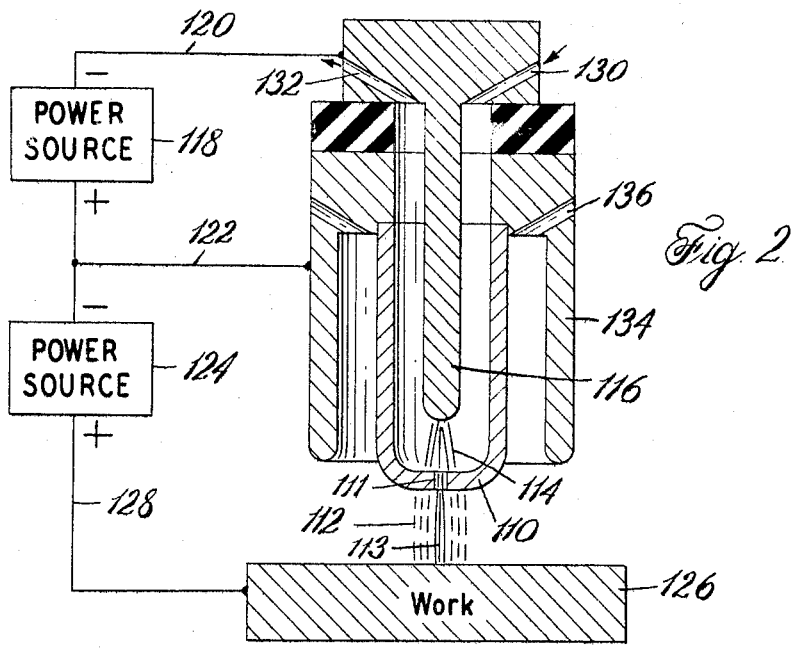
INVENTOR.
ONTARIO H. NESTOR
BY *Dominic J. Geminello*
ATTORNEY

United States Patent Office 3,250,893
Patented May 10, 1966

3,250,893
METHOD FOR PROVIDING A SOURCE OF HEAT
Ontario H. Nestor, Indianapolis, Ind., assignor to Union Carbide Corporation, a corporation of New York
Filed Oct. 1, 1963, Ser. No. 313,003
8 Claims. (Cl. 219—121)

This invention relates to a method and apparatus for providing a source of heat; and more particularly to a method and apparatus for providing an arc heating system wherein arc properties are altered by controlling cathode temperature.

Electric arcs are useful for welding, cutting, crystal growing, etc. In many instances, the arc is struck between a non-consumable electrode and a workpiece. In such systems, control over arc properties is desirable. For example, a system for controlling arc pumping is desirable in welding, because a reduction in arc pumping reduces undercutting in welding. Also desirable in welding is a system for attaining a particular arc shape, e.g. a ribbon plasma. An arc system having reduced arc pumping and a diffuse heat transfer pattern would be useful in welding to increase bead width as well as in the art of growing crystals by the arc Verneuil process.

A main object of the present invention is to provide a novel method and apparatus for providing a source of heat.

It is another object of this invention to provide an arc system wherein the arc properties are alterable.

Another object is to produce an arc system wherein the plasma to cathode contact area is controllable.

A further object is to provide an arc system wherein arc pumping is reduced.

Yet another object is to provide a system wherein the arc plasma may have an inverted shape.

Still another object is to provide an arc system wherein the arc produces a diffuse heat transfer pattern.

A still further object is to provide apparatus for practicing the system of the invention.

A further object is to provide apparatus which can be used as a radiant heating device.

These and other objects will be pointed out or become apparent from a reading of the following disclosure and drawings in which:

FIGURE 1 is a cross-sectional view of typical apparatus for carrying out the invention; and FIGURE 2 is a modification of the apparatus shown in FIGURE 1.

The objects of the invention are accomplished by a method wherein an arc is established between a non-consumable electrode and one surface of an electron emissive material whereby electrons can be emitted from another surface of such material or such surface can be used as a radiation heat source. More specifically, the objects are accomplished by establishing a second arc between the other surface of the electron emitting material and a work electrode whereby the second arc is used as a heat source and the plasma to cathode contact area of the second arc is altered by controlling the temperature of the other surface of the electron emitting material.

The advantages of the present invention include:

(1) A simple convenient way to alter plasma to cathode contact area with resultant control over arc pumping. That is especially useful for reducing undercutting in welding.

(2) Ability to control the heat transfer pattern at the anode, and (3) A simple way to achieve desirable arc shapes, e.g. a ribbon plasma.

One of the first limitations on the speed with which a weld can be made is undercutting. Undercutting is caused at least in part by arc pumping. Arc pumping results from a pressure differential in the arc column which is usually conical in shape. Increasing the arc plasma to cathode contact area changes the conical configuration to one which is essentially cylindrical thus reducing or eliminating the pressure differential with a corresponding reduction in arc pumping. As a matter of fact, the usual cone shape arc could be reversed, that is the arc could be broader at the cathode than at the anode, which is usually the workpiece.

As the cathode attachment zone is broadened, arc pumping is reduced and the delivery of hot gases to the anode attachment zone is thereby reduced. As a consequence, the electrical conductivity in the anode drop zone is lowered and the anode attachment zone contracts to recover sufficient conductivity in the gas space outside. Continued spreading of the cathode attachment will lead to continued shrinking of the anode attachment zone and ultimately to an inverted plasma geometry with reverse arc pumping.

Referring to FIGURE 1, typical apparatus for practicing the invention includes a thimble-shaped electrode 10 the outside bottom surface of which acts as the cathode in the preferred mode of operation for the external arc 12. Electrode 10 is heated by internal arc 14 established between electrode 16 and the inside bottom surface of the thimble electrode 10. A power source 18 supplies power for the internal arc 14 to electrode 16 through lead 20 and to the thimble electrode 10 through lead 22 and gas cup 34. The internal arc 14 heats the electrode 10 so that it acts as a hot cathode for the external arc 12. Power for the external arc 12 is provided by power source 24 through lead 22 connected to the electrode 10 and lead 28 connected to a work electrode 26.

Selected arc gas for the internal arc can be introduced through a plurality of apertures 30 so as to pass down and around the electrode 16 and then out through a plurality of apertures 32. Selected arc gas for the external arc is introduced through gas cup 34 through the plurality of apertures 36 so as to pass down and around the electrode 10 and arc 12. Such gases serve to control the atmosphere around the electrodes and to protect them from erosion. Gas cup 34 need not be directly connected to either of the electrodes. That it, it may be an independent structure, in which case the power sources would be directly connected to the thimble electrode 10.

Suitable materials for the electrodes 10 and 16 are those having good electrical emissivity such as tungsten or tungsten containing thoria, and for the gas cup 34 good thermally conductive materials such as copper could be used. Other useful electrode materials are graphite, carbon or copper. As another alternative, the electrode 16 could consist of an insert electrode such as described in U.S. Patent application Serial No. 183,880 now U.S. Patent No. 3,198,932, issued August 3, 1965.

It can be readily observed that by controlling the intensity and direction of the internal arc 14, a controlled portion of the surface of electrode 10 can be excited into emitting electrons. Thus, control over the plasma to cathode contact area of the external arc 12 can be achieved. Increasing the plasma to cathode contact area makes the arc shape essentially cylindrical thus reducing the pressure differential therein and substantially reducing arc pumping.

It will be apparent that almost any arc shape can be achieved by controlling the heat applied to a particularly shaped electron emitting material. For example, a "wedge shaped" electrode can be used to produce an arc sheet.

An important feature of the present invention is that it is possible to utilize the electrode 10 as a heat source independent of the external arc 12. Specifically, the internal arc 14 heats the electrode 10 to such a temperature that the electrode 10 may be used as a radiant heat source for welding, brazing or other applications. It can be shown that when electrode 10 consists of 1 percent thoriated tungsten, and when a suitable potential is maintained between the electrode and workpiece electron emission sufficient to cause a current flow of 10,000 amperes/cm.$^2$ can be obtained when the electrode 10 is heated to about 3000 deg. C.

It was also discovered that the phenomenon of electron emission makes it possible to initiate the external arc 12 directly by the application of an open circuit voltage (see Example II). In general, reliable external starting was made by applying open circuit voltage from a normal rectifier type welder (300 amp. at 40 v.) with a spacing between the anode workpiece and the electrode of up to 0.3 inch when using a 1% thoriated tungsten electrode 10. It was found that as the cahtode 10 approached the melting point of tungsten, starts could be made with a gap of 0.3 inch. On the other hand, when the temperature of the electrode dropped as low as 2190° C., there were no successful starts for gaps as small as 0.3 inch. That such large gaps (0.3 inch) undergo breakdown with low values of applied voltage is apparently to be attributed to the presence in the gap of a relatively high density of electrons emitted thermionically from the cathode 10. On this basis, it has been found that successful starts were obtained when the gap current was as low as $10^{-5}$ amperes prior to activating the power supply.

In addition to the fact that electrode 10 increases in emissivity when the internal arc is applied, the electrode itself constitutes a heat radiation source. Such radiation can be shown by the following table wherein tungsten and carbon are cited as the materials for the electrode 10.

TOTAL RADIATION INTENSITY FROM TUNGSTEN AND CARBON

| Temperature (Degs. C.) | Total Radiation (watts/cm.$^2$) | |
|---|---|---|
| | Tungsten | Carbon |
| 2,400 | 120 | 240 |
| 2,700 | 180 | 360 |
| 3,000 | 260 | 520 |
| 3,300 | 370 | 740 |
| 3,370 | (Tungsten Melts) | |
| 3,500 | | 1,040 |

Assuming the end of the electrode 10 is placed close to the surface to be heated, the listed intensities approximate the radiation intensity incident on the surface. Such heat intensity would be useful in welding thin materials or in brazing for example.

The preferred materials for electrode 10 are tungsten, tungsten containing thoria, or carbon. When using these materials, gases inert to the cathode such as argon, helium, nitrogen, and carbon monoxide may be used.

FIGURE 2 illustrates a modification of the present invention with like parts of the apparatus bearing the same reference character differing by 100. In this embodiment, the thimble electrode 110 has an orifice 111 located in the bottom surface thereof. An external arc 114 is established between the electrode 116 and inside bottom surface of thimble electrode 110. In this case, however, some of the arc plasma formed by introducing an arc gas into the internal arc 114 through apertures 130 passes out through aperture 111 to work electrode 126. The external arc is established from the outside bottom surface of electrode 110 to work electrode 126 and is centered about the plasma issuing from orifice 111. In this embodiment, by proper location of the orifice 111 or plurality of orifices, the external arc 112 and thus the current distribution can be shaped at hte anode workpiece. In addition, the arc 112 has a core 113 which is hotter than the outer plasma. A hot core plasma has utility in controlling weld puddle fluidity for example. Electrode 110 is acting as a good emitter and is constructed from a highly emissive material such as tungsten.

Weld bead dimensions produced by the system of the invention are unique when compared with beads obtained with conventional tungsten inert gas welding techniques. At a given value of heat transfer per unit length of plate, the conventional process produced a wider and deeper bead with a lower width-to-depth ratio and melted more metal per unit time than did the system of the invention. This identifies the arc source of the invention as the more diffuse heat source. This diffuse heat transfer pattern is also useful in arc-Verneuil crystal growing techniques.

The following examples are given by way of illustration of the concept of the invention.

*Example I*

In this first run, a simple test was made using apparatus of the general type depicted in FIG. 1. An internal arc was first established between a ⅛ inch diameter, 1% thoriated tungsten stick electrode and a second tungsten electrode having a wall thickness of ¹⁄₁₆ inches and an O.D. of 0.5 inch. After this arc reached 200 amperes at 9.4 volts, an external arch of 10 amperes was established with a 300 ampere RA welding generator between the second electrode and a water cooled copper anode. The internal arc was then varied between 100 amperes and 200 amperes at about 9.5 volts. During this time, the external arc was kept relatively constant at 10 amperes, while the voltage varied between 10 v. at an internal arc current of 200 amperes and 18 volts at an internal arc current of 100 amperes. Argon gas was used as the arc gas for both arcs. Both arc lengths were about 0.100 inch.

*Example II*

In this run, apparatus of the type of FIGURE 1 was used. The stick electrode 16 consisted of ³⁄₃₂ inch diameter, 2% thoriated tungsten rod. Electrode 10 consisting of 1% thoriated tungsten had a .480 inch O.D. and a .050 inch wall with a flat face. Using argon at the rate of 10 c.f.h., an internal arc of about 175 amperes (DCSP) at 12 volts (2.1 k.w.) was established. The arc length was about ⅛ inches. When electrode 10 reached about 3000° C. an external arc was established between electrode 10 and an anode workpiece (DCSP) by applying an open circuit voltage from a rectifier type welder (300 amp. at 40 v.). Argon was supplied as the external arc gas at the rate of 30 c.f.h. The external arc varied from 50–150 amperes at about 6 volts while the internal arc was varied from 175–229 amperes at about 13 volts. The arc attachment at the face of electrode 10 covered about half of the electrode face. The temperature of the electrode at internal arc currents of from 175–225 amperes varied between 2830° C. and 3250° C.

*Example III*

The apparatus was the same as that for Example II. The internal arc gas consisted of a mixture of 89.4% argon and 10.6% hydrogen by volume. The flow rate varied from 9.2 to 9.85 c.f.h. The external gas consisted of argon with a flow rate of 30 c.f.h. At an internal arc of 125 amperes at 14 volts, the temperature of the electrode 10 at its face was 2990° C. The external arc was then operating at 50 amperes at 6.4 volts. With an internal arc of 175 amperes at 14.2 volts, the electrode temperature at its face was 3090° C., while the external arc was operating at 100 amperes at 5.6 volts.

Thus, it can be seen that by using the argon-hydrogen mixture less current is needed to raise the temperature of the electrode face within the range of the melting point of tungsten.

*Example IV*

In this example, apparatus of the type depicted in FIGURE 2 was used. Electrode 110, consisting of 1% thoriated tungsten had an O.D. of .480 inch. It was ¹⁄₁₆ inch thick and had a ³⁄₃₂ inch hole drilled in its face. The internal electrode was 1% thoriated tungsten. Argon was used as the arc gas for both the internal and external arcs. The flow rates were 3 and 30 c.f.h., respectively. The internal arc varied from 75 to 120 amperes, while the external arc varied from 50 to 100 amperes. The internal arc extended through the ³⁄₃₂ inch hole to the workpiece which was about .22 inch from the face of the electrode.

*Example V*

In this run the apparatus of Example IV was used, excepting in this case a ¹⁄₁₆ inch hole was drilled in the electrode face. The internal arc gas consisted of a mixture of 85% argon and 15% hydrogen. The external gas was argon. The flow rates were 3–5 and 30 c.f.h., respectively. The external arc gap was 0.2 inch in length. With an internal arc of 50 amperes, the arc plasma extended through the hole, almost to the external electrode workpiece. An external arc of 50 amperes was then established. The diameter of the plasma cathode area was substantially greater than the ¹⁄₁₆ inch hole. Thus, the concept of FIGURE 2 is also feasible with an argon-hydrogen mixture as the internal arc gas.

What is claimed is:

1. A method for providing an arc heat source which comprises heating one side of a cathode material to cause electron emission from another side of said cathode material; establishing an arc between said other side of the cathode material and a workpiece electrode introducing a gas into said arc to provide an arc plasma, the plasma to cathode contact area of the arc being determined by the area of electron emission from the other side of said cathode material.

2. A method for providing an arc heat source which comprises establishing a first arc between one electrode and one side of a cathode material to cause electron emission from another side thereof; establishing a second arc between said other side of the cathode material and a workpiece electrode, introducing a gas into said arc to provide an arc plasma whereby the plasma to cathode contact area of the second arc is determined by the area of electron emission from the other side of said cathode material.

3. Method for providing an arc heat source which comprises heating the inside bottom surface of a thimble-shaped electrode; controlling the temperature of the outside bottom surface of said thimble-electrode to control electron emission therefrom and establishing an arc between said outside bottom surface of said thimble-electrode and a workpiece electrode, introducing a gas into said arc to provide an arc plasma whereby the plasma-to-cathode contact area of said arc is determined.

4. Method of providing a heat source comprising establishing a first arc between one electrode and the inside bottom surface of a thimble-shaped electrode, controlling the temperature of the outside bottom surface of said thimble-shaped electrode to control electron emission therefrom and establishing a second arc between said outside bottom surface of said thimble-electrode and a workpiece electrode, introducing a gas into said arc to provide an arc plasma whereby the plasma-to-cathode area of said arc is determined.

5. A method for providing an arc source of heat comprising establishing a first arc between one electrode and the inside bottom surface of a thimble-shaped electrode; introducing an arc gas into said first arc to produce a first arc plasma; passing said first arc plasma through an orifice in the bottom surface of said thimble-shaped electrode; controlling the temperature of the outside bottom surface of said thimble-shaped electrode to control electron emission therefrom; establishing a second arc between the outside bottom surface of said thimble-electrode and another electrode and centered around the first arc plasma passing through the orifice in the bottom surface of said thimble-electrode; and passing a second arc gas into said second arc to form a second arc plasma column, whereby the plasma-to-cathode contact area of said second arc is determined and said second arc has a plasma core that is hotter than outer plasma in said second arc plasma column.

6. An arc heating aparatus comprising a thimble-shaped electrode having inside an outside bottom surfaces; another electrode positioned within said thimble-electrode and in electrical circuit relation with said inside bottom surface of said thimble-electrode; power supply means for providing arc power to an arc established between said other electrode and said inside surface of said thimble-electrode; means for introducing arc gas into the so-established arc; another power supply means connected in circuit relationship with the outside bottom surface of said thimble-electrode and a work electrode and means for supplying another arc gas into an arc column established between said outside bottom surface of said thimble-electrode and said work electrode.

7. A method for providing an arc heat source which comprises heating one side of a thoriated tungsten cathode to cause electron emission from another side thereof, spacing said other side of said theoriated tungsten cathode up to about 0.3 inch from a workpiece anode, continuing to heat said one side of said thoriated tungsten cathode to the vicinity of the melting point of tungsten, and applying open circuit voltage from a D.C. welding power source to thereby establish an arc between said other side of said thoriated tungsten and said anode workpiece.

8. A method for providing an arc heat source which comprises establishing a first arc between one electrode and one side of a thoriated tungsten cathode to heat said side and to cause electron emission from the other side thereof, spacing said other side of said thoriated tungsten cathode up to about 0.3 inch from a workpiece anode, continuing to heat said one side of said thoriated tungsten cathode to the vicinity of the melting point of tungsten, and applying open circuit voltage from a D.C. welding power source to thereby establish an arc between said other side of said thoriated tungsten and said anode workpiece.

References Cited by the Examiner

UNITED STATES PATENTS

| | | | |
|---|---|---|---|
| 620,306 | 2/1899 | Hadaway | 219—121 X |
| 1,408,053 | 2/1922 | Wensley | 313—305 X |
| 1,655,966 | 1/1928 | Lorenz | 313—347 X |
| 2,283,639 | 5/1942 | Kling | 313—305 X |
| 3,118,081 | 1/1964 | Lange | 313—347 |

RICHARD M. WOOD, *Primary Examiner.*

J. V. TRUHE, *Assistant Examiner.*